A. T. VICK.
LOCOMOTIVE BOILER WASHING OUT AND REFILLING SYSTEM.
APPLICATION FILED NOV. 6, 1911.
1,065,644.
Patented June 24, 1913.
4 SHEETS—SHEET 1.
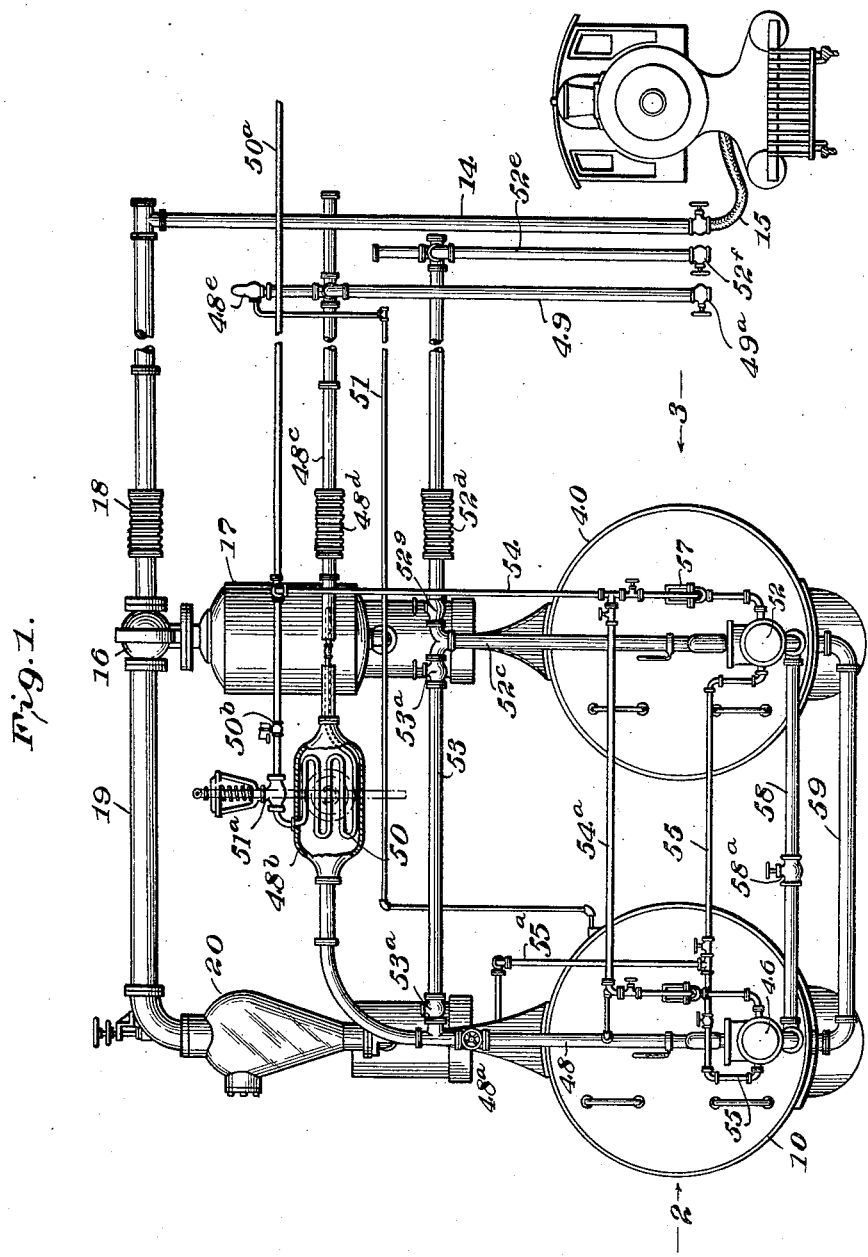
Witnesses,
J. Adolph Bishop
Wm. Janne.
Inventor,
Augustas T. Vick,
By J. R. Cornwall.
Attorneys

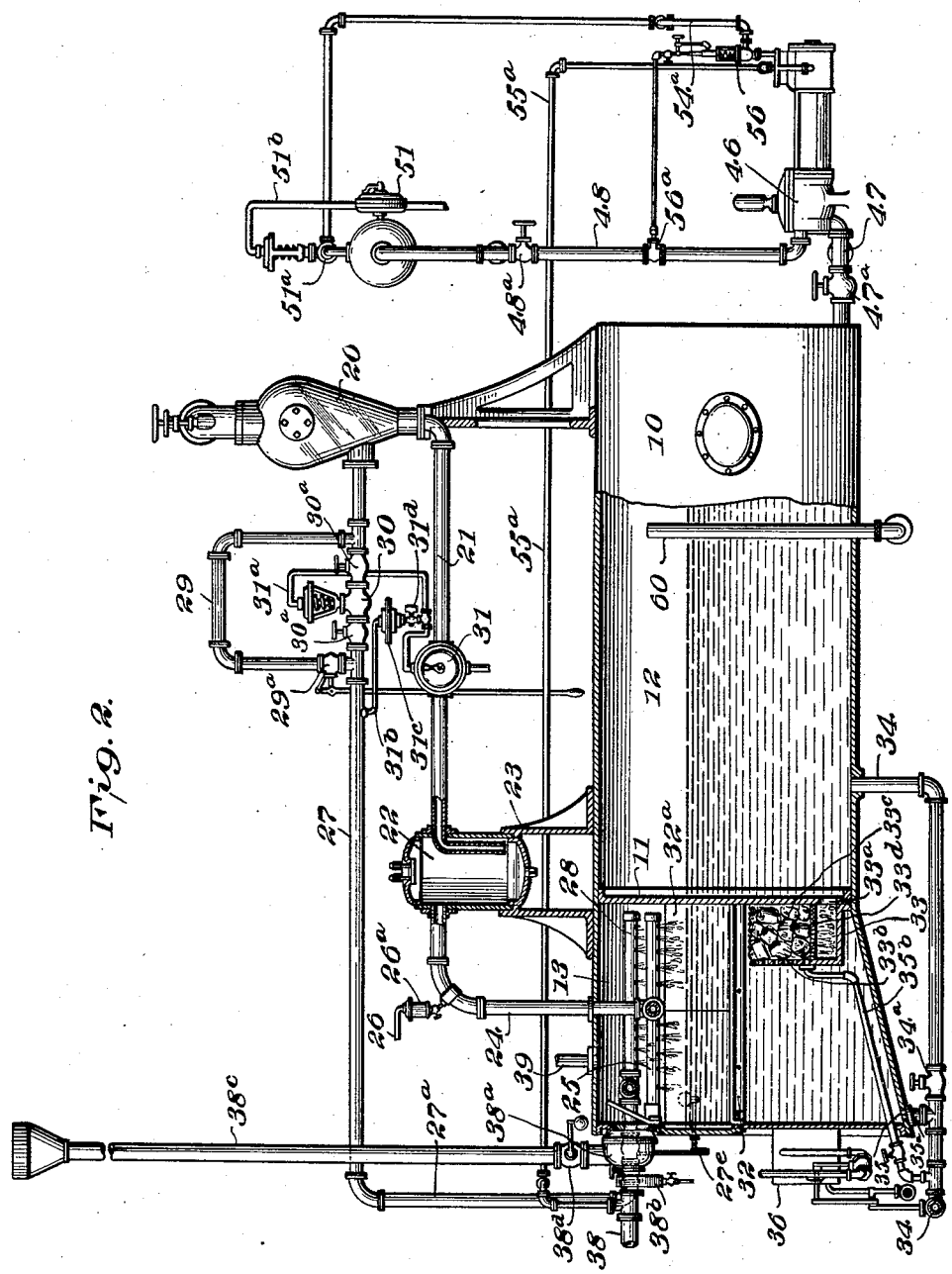

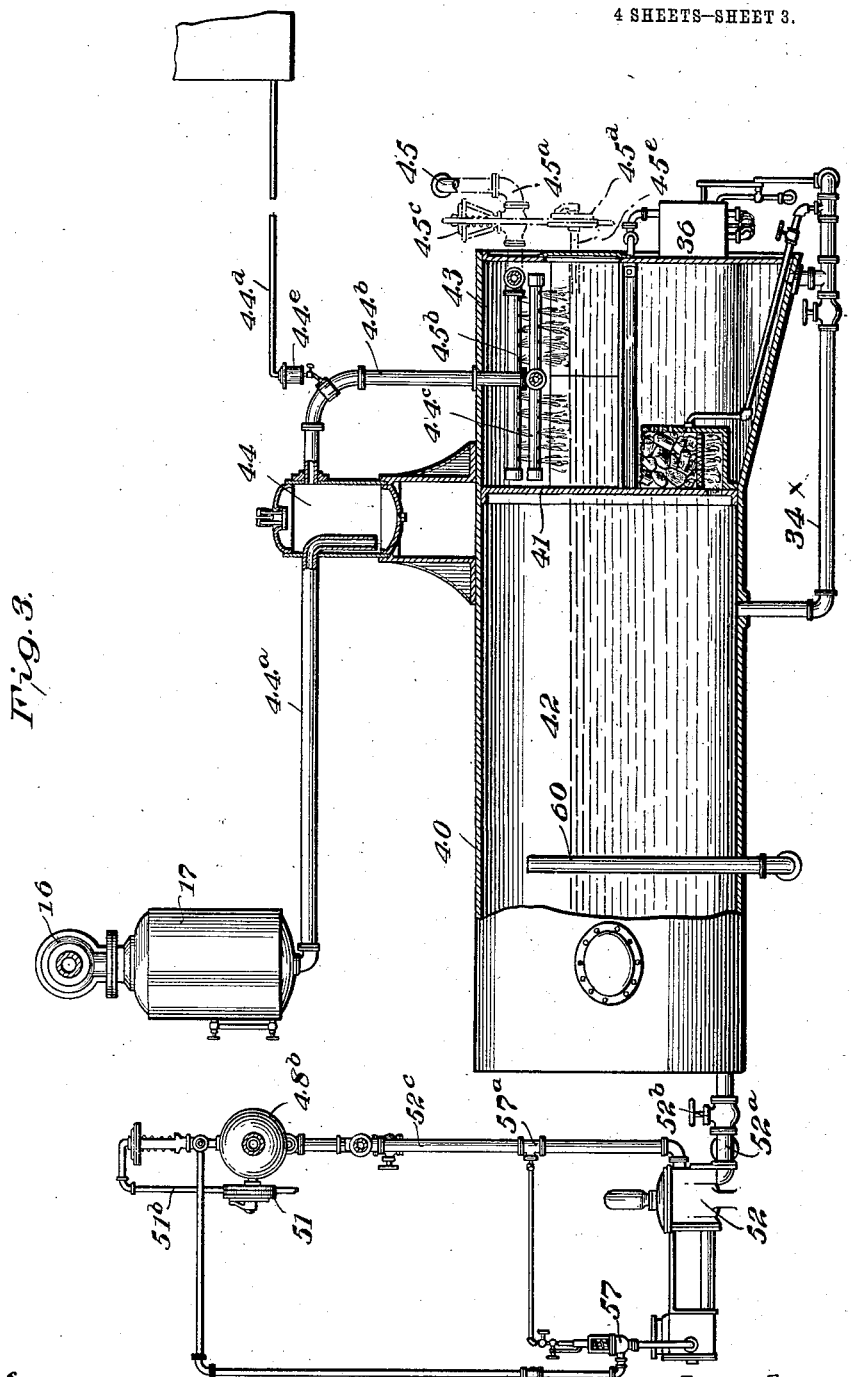

A. T. VICK.
LOCOMOTIVE BOILER WASHING OUT AND REFILLING SYSTEM.
APPLICATION FILED NOV. 6, 1911.
1,065,644.
Patented June 24, 1913.
4 SHEETS—SHEET 4.
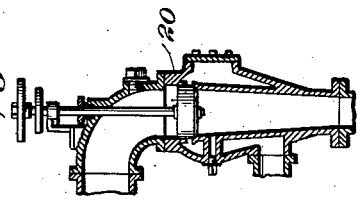
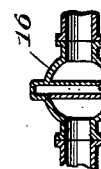
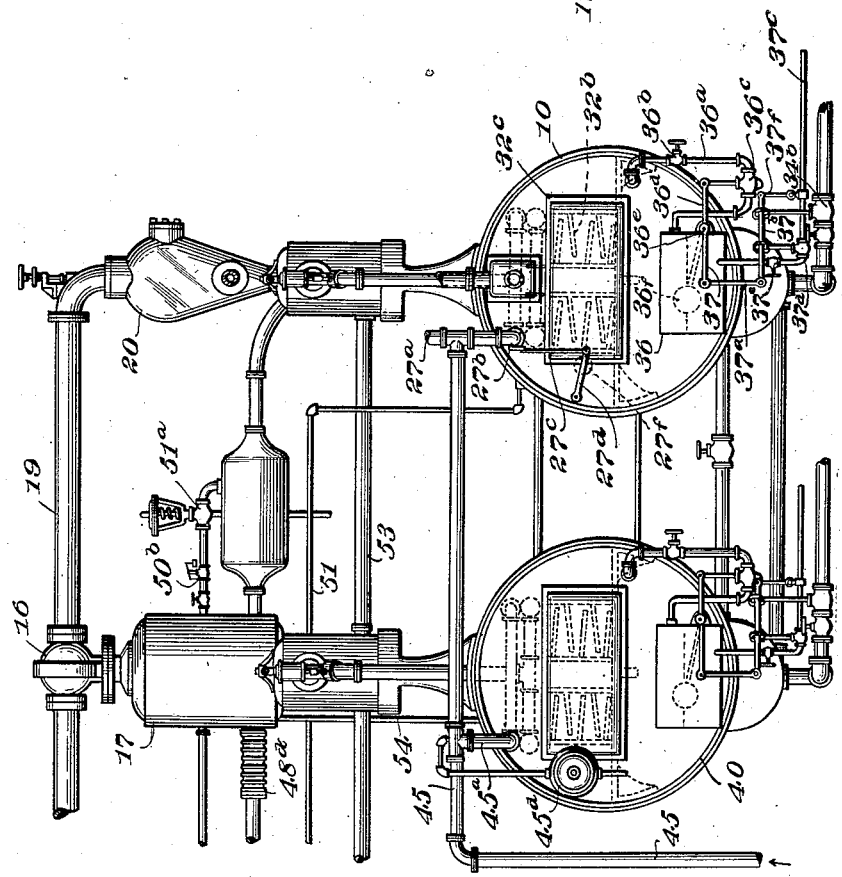
Witnesses:
J. Adolph Bishop
Wm. Janus
Inventor:
Augustas T. Vick,
By J. R. Carnval.
Attorney

UNITED STATES PATENT OFFICE.

AUGUSTAS T. VICK, OF ST. LOUIS, MISSOURI.

LOCOMOTIVE-BOILER WASHING-OUT AND REFILLING SYSTEM.

1,065,644. Specification of Letters Patent. Patented June 24, 1913.

Application filed November 6, 1911. Serial No. 658,716.

*To all whom it may concern:*

Be it known that I, AUGUSTAS T. VICK, a citizen of the United States, residing at St. Louis, Missouri, have invented a certain new and useful Improvement in Locomotive-Boiler Washing-Out and Refilling Systems, of which the following is a full, clear, and exact description, such as will enable others skilled in the art to which it appertains to make and use the same, reference being had to the accompanying drawings, forming part of this specification, in which—

Figure 1 is a diagrammatic front elevation of a system of my improved construction showing the blow off pipe thereof connected to a locomotive boiler. Fig. 2 is an elevation looking in the direction indicated by arrow 2 in Fig. 1 and showing the wash out tank in vertical section. Fig. 3 is an elevational view taken looking in the direction indicated by arrow 3 in Fig. 1 and showing the refilling tank in vertical section. Fig. 4 is a rear elevation of the two tanks and showing the various connections thereto. Fig. 5 is a vertical section taken through the center of the jet condenser used in connection with my improved system. Fig. 6 is a vertical section taken through the center of a two stage separator used in connection with my improved system.

This invention relates to a system for blowing off, washing out and refilling locomotive boilers, and it is the purpose of my invention to provide a comparatively simple, automatically controlled system, wherein practically all of the heat contained in the steam and water blown off from a locomotive boiler is utilized and maintained in the wash out water and refilling water, to purify and filter the water and the water of condensation resulting from the steam blown off from the locomotive boiler, and to re-use this water in its purified condition for washing out and refilling purposes.

In ordinary use, the water used in a locomotive boiler becomes foul or dirty, for the reason that continued evaporation tends to concentrate the impurities, thereby creating scale and sediment which settles on the surfaces of the boiler tubes and sheets, thereby materially affecting the efficiency of the boiler and for this reason it is essential that the boilers be thoroughly washed out and refilled at suitable intervals.

Ordinarily the blowing off, washing out and refilling of locomotive boilers involves considerable time and labor, especially where cold, or comparatively cool, water is used for washing out and refilling purposes, and it is one of the objects of my invention to condense the blown out steam and to filter and purify the blown out water, and the water of condensation, and to utilize the same, in purified condition as washing out water and refilling water, and also for the purpose of heating such additional water as may be required in washing out and refilling, thereby utilizing with economy practically all the heat contained in the blown out steam and water.

A further object of my invention is to provide a washing out and refilling system which is simple, economical and efficient in operation, which can be cheaply installed and which system can be built from ordinary material and standard fittings such as can be readily obtained in the open market, thereby avoiding the use of special fittings and castings, which are expensive as compared to standard parts and materials.

To the above purposes, my invention consists in certain novel features of construction and arrangement of parts hereinafter more fully described and claimed.

Referring by numerals to the accompanying drawings, 10 designates a tank adapted to contain water used in refilling the washed out locomotive boiler, and located within said tank is a wall or partition 11 which divides said tank into two compartments, the larger one 12 of which contains the purified refilling water, and the smaller compartment 13 contains the sediment trays and filtering means utilized for purifying all the water which passes into the chamber 12 and which is pumped therefrom into the washed out locomotive boiler.

14 designates a blow off pipe provided at one end with a flexible tube 15 which is adapted to be connected to the boiler to be washed out and refilled, and this pipe 14 leads to the head 16 of an ordinary well-known type of two-stage separator tank 17. Located at convenient point in the pipe 14 is an expansion joint 18. Leading from the head 16 of the separator 17 is a pipe 19 which discharges into the upper end of a standard type of jet condenser 20, and leading from the lower end of a condenser is a pipe 21 which extends into the lower end of this intercepting tank 22, which latter is mounted on a suitable support 23 positioned on the tank 10. This intercepting tank 22 is for the purpose of reducing and relieving the pressure of and condensing whatever steam passes through the jet condenser.

24 designates a pipe leading from the tank 22 downward through the shell of the tank 10 into the compartment 13, and connected to the end of this pipe 24, within said compartment is a pair of spray pipes 25. Connected to the pipe 24 between the tank 22 and the tank 10 is a pipe 26 which is provided with a sight feed device $26^a$ and which pipe leads from a tank or other receptacle (not shown), and thus the water passing through said pipe 24 can be, if desired, chemically treated for the purpose of eliminating undesirable elements that may be contained therein and assisting in the precipitation of the scale and sediment contained in said water.

Leading into the lower portion of the outer chamber of the jet condenser 20 is a pipe 27 having a vertical leg $27^a$ at the rear end of the apparatus and the lower end of which vertical leg is extended into the compartment 13 and is there provided with a pair of spray pipes 28 which are preferably located immediately above the spray pipes 25. This pipe 27 is for the purpose of delivering condensing water into the jet condenser 20. Located in the horizontal extension of the leg 27 just outside the tank 10 is a valve $27^b$, and connected to the stem thereof is the upper end of a link $27^c$, the lower end of which is pivotally connected to the end of a lever $27^d$, which latter is fixed on the outer end of a shaft $27^e$, the same being journaled in the rear head of the tank 10 and provided on one end with a suitable float $27^f$. This float rises and lowers with the water level within the compartment 13 and thus the valve $27^b$ is controlled so as to regulate the flow of water through the pipes 27 and $27^a$. Connected to the pipe 27 is a by-pass pipe 29 and located in said pipe 27 between the legs of the by-pass 29 is a diaphragm valve 30, and a pair of cut-off valves $30^a$.

Connected to the pipe 21 is a thermostat 31 and leading from one side thereof to the diaphragm of the valve 30, is a pipe $31^a$. Leading from this pipe $31^a$ to the pipe 27 behind the by-pass 29 is a pipe $31^b$ in which is located a diaphragm $31^c$. A valve $31^d$ is located in the pipe $31^b$ below the diaphragm $31^c$. The thermostat 31 is controlled by the degree of heat of the steam and hot water passing through the pipe 21 and said thermostat controls the action of the valve 30 in the pipe 27 leading from the jet condenser 20.

A manually operated valve $29^a$ is located in one of the legs of the by-pass pipe 29 and may be used in an emergency in case the thermostatic control is, for any reason, out of service.

Located on the interior of the tank 10 within the chamber 13 and on opposite sides thereof are brackets 32, which support auxiliary brackets $32^a$, each one of which carries a series of shelves or baffle plates $32^b$. The plates are preferably slightly inclined relative to a horizontal plane and are located immediately beneath the pairs of pipes 25 and 28 so that the water discharging from said pipes will pass over said plates in passing into the lower portion of the compartment 13.

A removable plate or head $32^c$ normally covers an opening in the rear head of the tank 10, thus providing means whereby access may be had to the compartment 13 for the purpose of inserting or removing the various parts of the apparatus positioned within said compartment.

Positioned within the compartment 13 against the lower portion of the wall or partition 11 is a filter box 33, the lower portion of which communicates with an opening $33^a$ formed in the lower portion of said wall or partition 11. The upper portion of the front wall of the filter box is perforated, as designated by $33^b$, and located within the upper portion of said filter box is a bed $33^c$ of charcoal or analogous filtering material, and positioned beneath this filtering bed and above the opening $33^a$ is a filtering blanket $33^d$ of fabric or like material. The arrangement just described provides for the complete filtration of the refilling water as it passes from the compartment 13 through the opening $33^a$ into the compartment 12.

34 designates a pipe leading from the compartment 12 rearwardly beneath the tank 10 and said pipe discharges into the sewer or other outlet. Leading from an outlet 35 in the bottom of the tank 10 at the lower end of the compartment 13 is a pipe $35^a$ which connects with the pipe 34, and located in said pipe 34 immediately in front of this connection is a valve $34^a$.

$35^b$ designates a pipe which leads from the pipe 34 at a point in front of the connection $35^a$ to the lower portion of the filter box $33^b$, and which pipe $35^b$ is for the purpose of conveying water into the filter for washing out the filtering bed and blanket therein.

The means for automatically blowing off or discharging impure water and sediment from the lower portion of the compartment 13 will now be described.

Located on the rear head of the tank 10 is a box 36 and discharging thereinto is a pipe 36$^a$ which leads from the interior of the compartment 13 and in which pipe 36$^a$ is located a manually controlled valve 36$^b$ and a valve 36$^c$.

The outer end of a lever 36$^d$ is pivotally connected to the upper end of the stem of the valve 36$^c$, and the opposite end of this lever is fixed to a rock shaft 36$^e$ that is journaled in suitable bearings on the box 36. Connected to this shaft 36$^e$ and extending into the box 36 is an arm carrying on its free end a float 36$^f$. Fixed to the outer end of the rock shaft 36$^e$ is one end of a horizontally disposed lever 37, and pivotally connected to the opposite end of this lever is the upper end of a vertically disposed link 37$^a$. Pivotally connected to the lower end of this link 37$^a$ is one end of a horizontally disposed lever 37$^b$. A discharge pipe 37$^c$ leads from the box 36, and located in this pipe are valves 37$^d$ and 37$^e$, which latter is adapted to be manually operated. The outer end of the horizontally disposed lever 37$^b$ is pivotally connected to the upper end of a standard 37$^f$, the lower end of which latter is pivotally connected to a collar on the pipe 37$^c$. The upper end of the stem of the valve 37$^d$ is provided with a vertically disposed slot through which passes the lever 37$^b$. Located in the discharge pipe 34 is a valve 34$^b$, and the upper end of the stem thereof is provided with a vertically disposed slot through which passes the lever 37$^b$.

The internal ports or openings within the valve 36$^c$ are arranged so that a comparatively long movement of the valve stem is required to close or cut off the passage of water through said valve. During the time the float is in the lower portion of the box 36 the lever 37$^b$ is positioned in the lower portions of the slots formed in the upper ends of the stems of the valves 37$^d$ and 34$^b$, and thus said valves are held closed.

The operation of the mechanism just described for bringing about an automatic discharge of the precipitated matter or sediment from the bottom of the compartment 15 is as follows: While the float 36$^f$ is in the lower portion of the box 36 the valve 36$^c$ is maintained in full open position and the valves 37$^d$ and 34$^b$ are held closed by reason of the engagement of the lever 37$^b$ against the stems of said valves at the lower ends of the vertical slots therein. As the valve 36$^c$ is open water flows through pipe 36$^a$ into the box 36, and as the water rises in said box the float 36$^f$ is elevated, thereby moving the outer end of the lever 36$^d$ downward, thus slowly reducing the volume of water flowing through the pipe 36$^a$ into said box 36. As the float 36$^f$ slowly rises within the box 36 the end of a lever 37 is slowly elevated, thereby raising link 37$^a$ and corresponding end of the lever 37$^b$, and during this upward movement of said last mentioned lever it traverses the slots in the upper portions of the stems of valves 37$^d$ and 34$^b$. As this upward movement of the float and lever 37$^b$ continues said lever engages against the stems of valves 37$^d$ and 34$^b$ at the upper ends of the slots, thereby raising said valve stems, and as a result, the valves on the lower ends of said stems are raised from their seats, thereby permitting the sediment and precipitated matter in the bottom of the filtering and precipitating compartment to discharge through pipe 34. Simultaneous with this discharge of sediment and precipitated mattter the water within the box 36 discharges through pipe 37$^c$ in which the valve 37$^d$ is located, which action permits the float to drop within the box, but during the greater portion of the downward movement of the lever 37$^b$ following the downward movement of said float said lever travels through the slotted upper ends of the stems of the valves 37$^d$ and 34$^b$, and thus said last mentioned valves maintain their open positions during the greater part of the downward movement of said float and the lever 37$^b$. When the float 36$^f$ moves to its lowest position within the box, the lever 37$^b$ engages the stems of valves 37$^d$ and 34$^b$ at the lower ends of the slots therein, and bears downward on said stems to close said valves, thereby cutting off the further discharge of water from the box 36 and the sediment and precipitated matter through the pipe 34. The valve 36$^b$ is adjusted so as to partially cut off the flow of water through pipe 36$^a$, and thus the flow of water through said pipe into the box 36 is never as great as is the volume of the discharge through pipe 37$^c$. When the float 36$^f$ rises to its limit of movement within the box the valve 36$^c$ is almost wholly closed, and thus the volume of water discharging through pipe 36$^a$ into said box is comparatively small. When the float drops within the box and the valves 37$^d$ and 34$^b$ are closed the valve 36$^c$ is again opened to permit water to pass through pipe 36$^a$ into box 36.

In order to utilize the exhaust steam from a stationary power plant, and in order to provide additional hot water for the tank 10, an exhaust steam pipe 38 leads to an exhaust inlet 38$^a$ in the rear of the tank 10, and located in this tank in front of said inlet is an oil separator 38$^b$. Leading upwardly from the exhaust inlet 38$^a$ is an exhaust pipe 38$^c$ in which is located a combined back pressure and relief valve 38$^d$.

Located in the top of the compartment 13 is a vent pipe 39 for the purpose of relieving any pressure which may occur within said compartment.

40 designates what is termed a wash-out water tank inasmuch as it contains the water used for washing out the locomotive boiler.

The washing out water is preferably maintained at a temperature of about 130°, whereas it is the intention to maintain the water in the refilling water tank 10 at a temperature of approximately 210°.

The tank 40 is preferably constructed identically like the tank 10 in size and structure and said tank is provided with a partition 41 which divides said tank into two compartments 42 and 43, the first being occupied by the washing out water and the second being occupied by the purifying and filtering means through which the washing out water passes before entering the compartment 42.

Located above the rear portion of the tank 40 is an intercepting tank 44 which is a counterpart of the intercepting tank 22, and leading from the lower end of the separator 17 into the lower portion of said intercepting tank 44 is a pipe 44$^a$. Leading from the upper portion of the intercepting tank 44 downward into the compartment 43 is a pipe 44$^b$ in every way similar to the pipe 24 and connected to said pipe 44$^b$ within the upper portion of the compartment 43 is a series of jet pipes 44$^c$. Leading to the pipe 44$^b$ is a pipe 44$^d$ provided with a sight feed device 44$^e$, and which pipe is for the purpose of supplying a suitable chemical to the hot water as it enters the compartment 43, thereby chemically treating said water to eliminate certain undesirable elements and to aid in the precipitation of the scale and sediment contained in the water.

45 designates a cold water inlet pipe which is provided with a branch 45$^a$ leading through the rear head of the tank 40 and connected to said branch within the compartment 43 is a series of jet pipes 45$^b$ which are preferably positioned immediately above the jet pipes 44$^c$. This pipe 45 extends beyond the tank 40 and is connected to the leg 27$^a$ of pipe 27, which latter enters the rear and of the tank 10. This cold water pipe 45 is for the purpose of supplying cold water to temper the washing out water in tank 40, for supplying tempering water to the refilling tank and also for supplying condensing water through pipes 27$^a$ and 27 to the jet condenser 20.

Located in the branch 45$^a$ is a diaphragm valve 45$^c$ controlled by a thermostat 45$^d$, and which latter is provided with a tube 45$^e$ which leads through the rear head of the tank 40 into the compartment 43. This thermostat is for the purpose of regulating the temperature of the water within the tank 40, and should the temperature of this water rise above the desired temperature, namely, 130°, the thermostat 45$^d$ will be actuated to open the diaphragm valve 45$^c$, thereby permitting cold water from the pipe 45 to enter the compartment 43 and discharge from the jet pipes 45$^b$ which are connected to the branch 45$^a$ within the chamber 43. The water issuing from the jet pipes 45$^b$ tempers or cools the water issuing from the jet pipes 44$^c$, and thus the water within the tank 40 is automatically maintained at the desired temperature, namely, 130°.

The interior of the compartment is equipped with a set of devices which are identically the same as the devices located within the compartment 13, which devices include pairs of brackets, baffle plates carried by said brackets, the filter positioned against the lower portion of the partition between the compartments 42 and 43 and the filter wash out pipe which leads to the lower portion of the filter box.

A pipe 34$^x$ which is a counterpart of the pipe 34, leads from the underside of the tank 40 to the sewer or other outlet, and positioned on the rear head of the tank 40 is a float box 36$^x$ which is identically like the box 36, and said box 36$^x$ and the pipe 34$^x$ are equipped with a set of valves, levers, and devices identically like the corresponding devices on the rear head of the tank 10, and this second set of devices are for the purpose of automatically blowing off or discharging the sediment and slime and dirty water which accumulates in the bottom of the compartment 43.

Inasmuch as the various devices applied to the rear end of the tank 40 are in every way similar to the corresponding devices on the rear head of the tank 10, a detailed description of the second set of devices is not necessary.

46 designates the filling pump inasmuch as it is used for pumping the water from the tank 10 into the locomotive boiler when the same is refilled, and leading from said pump to the tank 10 is a suction pipe 47 provided with a valve 47$^a$. Leading from the pump 46 is a pipe 48 provided with a valve 48$^a$ and this pipe 48 leads to a reheating tank 48$^b$ located above and between the tanks 10 and 40. Leading from this reheating tank is a pipe 48$^c$ provided with an expansion joint 48$^d$ and connected to this pipe 48$^c$ is a cushion and relief valve 48$^e$ which is for the purpose of absorbing shocks which may occur in the pipe leading from the refilling pump to the locomotive boiler. Leading from the pipe 48$^c$ is a pipe 49 provided with a valve 49$^a$ and a flexible tube is adapted to be connected to this pipe 48 when the locomotive boiler is to be refilled. Located within the reheating tank 48$^b$ is a heating coil 50, one end of which extends into the pipe 48$^c$ and leading to said coil is a live steam pipe 50$^a$ in which is located a regulating valve 50$^b$.

Located on the tank 48$^b$ is a thermostat 51 controlled by the heat within said tank and leading from said thermostat to the diaphragm of a valve 51$^a$ located in the live steam pipe 50ª is a pipe 51ᵇ. The thermostat 51 is set to operate at 210° and should the temperature within the tank 48ᵇ fall below 210°, then the thermostat will act to permit the diaphragm valve 51ª to open, thereby admitting steam through the pipe 50ª into the coil 50, thus bringing the heat of the water within the pipe 48ᶜ up to 212°. Leading from the relief valve 48ᵉ to the interior of the tank 10 is a circulating pipe 51.

52 designates the wash-out pump inasmuch as it is used for withdrawing the water from the tank 40 and forcing the same into the locomotive boiler during the wash-out operation, and leading from the compartment 42 within the tank 40 to this pump is a suction pipe 52ª provided with a valve 52ᵇ. Leading from the pump 52 is a wash-out line pipe 52ᶜ and located therein is an expansion joint 52ᵈ. Connected to the pipe 52ᶜ is a vertical leg 52ᵉ provided adjacent its lower end with a valve 52ᶠ and a flexible tube is adapted to be connected to the leg 52ᵉ when the locomotive boiler is being washed out.

53 designates a by-pass pipe which connects the pipes 48 and 52ᶜ and located in said pipe 53 are valves 53ª.

The steam for operating the pumps 46 and 52 is taken from the steam pipe 50ª through a pipe 54 and branch 54ª which lead to the steam chests of the pumps and said pipe branch being provided with suitable valves for controlling passage of steam therethrough.

The exhaust from the pumps is taken through branch pipes 55 which lead to a single exhaust pipe 55ª and which latter extends rearwardly over the tank 10 and enters the pipe 38 in front of the oil separator 38ᵇ.

56 designates pump governor valve located in the steam inlet pipe 54ª for the purpose of controlling the supply of steam to the pump 46 and which valve 56 is controlled by a pressure regulated device 56ª located in the pipe 48. A corresponding pump regulating valve 57 is located in the steam pipe 54 leading to the pump 52 and which valve is controlled by a pressure regulated device 57ª located in the pipe 52ᶜ.

A by-pass pipe 58 provided with a valve 58ª connects the suction pipes 47 and 52ª, and an equalizing pipe 59 extends from the interior of the chamber 12 into the chamber 42, said last mentioned pipe being provided with vertical legs 60 which extend to points above the normal water line within the tanks.

The operation of my improved system is as follows: The flexible tube 15 is connected at one end to the blow-off pipe 14 and at the opposite end to the outlet of the locomotive boiler to be blown off, washed out and refilled and the steam and hot water discharge from the locomotive boiler through the flexible tube 15, through the blow-off pipe 14 and pass from thence into the head 16 of the two stage separator tank 17. The hot water separator from the steam in this separator passes through the pipe 44ª into tank 44, and the steam which passes through said separator passes through pipe 19 into the jet condenser 20 wherein practically all of the steam is condensed and whatever steam passes through this jet condenser passes into the intercepting tank 22 through the pipe 21, and is condensed therein. The water which accumulates within the tank 22 is maintained in a highly heated condition by the continued discharge of steam and hot water from pipe 21 and the water at a temperature of 210° or upward discharges from the intercepting tank 22, through the pipe 24 and passes from thence through the jet pipes 25. The heated water from said jet pipes passes downwardly over the baffle plates 32ᵇ into the lower portion of the compartment 13 and by reason of the highly heated condition of the water rapid precipitation will take place and scale and sediment contained in said water will gravitate to the bottom of the compartment 13 and the heated water is thoroughly filtered and purified in passing through the filtering bed 33ᶜ and filtering blanket 33ᵈ before said water discharges through the opening 33ª into the chamber 12 within the tank 10. If desired, a suitable chemical may be delivered to the water passing from the pipe 24 by means of the pipe 26 and which chemical tends to increase precipitation and the separation and elimination of the undesirable elements from the impure water. An automatic discharge of the slime and scale from the lower portion of the compartment 13 is brought about by the action of the float 36ᶠ within the box 36, which operation has been hereinbefore described.

Condensing water from pipe 45 passes through leg 27ª and pipe 27 into the outer chamber within the condenser 20, and whatever steam leaves the separator tank 17 enters the upper end of the jet condenser through pipe 19. The valve of the jet condenser is set so as to permit the condensing water from the outer chamber to enter the inner chamber in the form of a thin sheet or jets of spray, and thus as the steam passes from the upper end of the jet condenser into the inner chamber therein it will be, to a large extent if not wholly, condensed. The water of condensation and condensing or injection water accumulating within jet condenser 20 discharges through pipe 21 into the intercepting tank 22 wherein all of the steam is condensed, and from said tank this water passes through pipe 24 and discharges into the compartment 13 from the spray pipes 25, which latter are connected to pipe 24. The passage of condensing or injection water through the pipe 27 is regulated by the diaphragm valve 30, which latter is controlled by the thermostat 31 located in the pipe 21. If, for any reason, this thermostat and diaphragm valve becomes inoperative, the valves 30$^a$ can be closed and the condensing or injection water to the jet condenser 20 can be taken around the valve 31$^a$ through by-pass pipe 29 provided with the manually controlled valve 29$^a$.

The water passing into the intercepting tank 44 from the pipe 44$^a$ passes into the compartment 43 through pipe 44$^b$, and, if desired, a suitable chemical may be mixed with this water by means of the pipe 44$^d$ leading from a chemical tank for the purpose of assisting in the purification of the wash-out water. The water discharges from the jet pipes 44$^a$ on to the baffle plates within the upper portion of compartment 43 and the sediment and impurities in said water settle to the bottom of the compartment 43 from whence they are blown off at suitable intervals by the automatic action of the float within the float box 36$^x$, the operation of which is identically the same as the automatic blowing off apparatus located at the rear end of the tank 10 and heretofore described.

The water within the compartment 43 is filtered and purified as it passes through the filter located in the lower portion of said compartment and in its purified condition said water passes into the compartment 42. It is desirable that this wash-out water be maintained at a temperature of about 130°, and if the temperature of the water discharging from the jet pipes 44$^c$ rises above 130°, the thermostat 45$^d$ will be actuated thereby opening valve 45$^c$, thus permitting cold water to pass through pipe 45 and branch 45$^a$ into the compartment 43 and discharge from the jet pipes 45$^b$, thereby tempering or cooling the water within the washing-out tank and maintaining said water at or near the desired temperature.

After the locomotive boiler has been blown off, the washing-out operation is accomplished by connecting the flexible tube 15 with the lower end of the pipe 52$^e$, and when the valve 52$^f$ is opened, the reduced pressure in the wash-out line permits the device 57$^a$ to actuate thereby opening the valve 57 to admit steam to the cylinder of pump 52. As this pump is operated, the washing out water is drawn from the compartment 42 through the pipe 52$^a$ and open valve 52$^b$ and said water is forced through pipe 52$^c$, expansion joint 52$^d$, leg 52$^e$ and flexible tube 15 into the locomotive boiler. The washing out water is maintained at a temperature of about 130°, for the reason that water at a higher temperature cannot be readily handled by the operators during the washing out operation and after the washing out has been accomplished, the locomotive boiler is left at a temperature of 130°, or slightly less.

To refill the locomotive boiler, the flexible tube 15 is connected to the lower end of the leg 49 and the filling pump 46 is automatically started when valve 49$^a$ is opened, and as said pump is operated, purified refilling water at the temperature of approximately 210° is drawn from the compartment 12 in tank 10 through pipe 47 and open valve 47$^a$ and this refilling water is forced through pipe 48, heating tank 48$^b$, pipe 48$^c$ provided with the expansion joint 48$^a$ and from thence through leg 49, and flexible tube 15 into the locomotive boiler.

Should the refilling water delivered through the tank 48$^b$ have a temperature less than 210°, the thermostat 51 will be actuated to open the diaphragm valve 51$^a$, thereby admitting live steam into the coil 50, from live steam pipe 50$^a$ and the water passing through the pipe 48$^a$ will be heated to the temperature of 210° or more and in such condition will be delivered into the locomotive boiler.

It will be noted that in my improved system of washing out and refilling locomotive boilers, that the hot water discharged from the locomotive boiler is separated from the steam and is then taken directly into the wash-out water tank, wherein it is filtered and purified and said water then passes into the purified water compartment of the wash-out water tank to be again forced into the locomotive boiler for the purpose of washing out the interior thereof. Thus the heat contained in the water discharged from the locomotive boiler is not wasted or lost, but is retained in the volume of water within the wash-out water tank, and for this reason, the wash-out water is economically heated.

The blown out steam from a locomotive boiler is condensed and passed directly into the refilling tank with the loss of but a very small per cent. of the heat contained in said steam, and the water of condensation which has a temperature of approximately 210°, is purified and filtered in the precipitating compartment of the refilling water tank and passes from thence into the purified water compartment from whence it is withdrawn and delivered into the locomotive boiler at a temperature slightly below 212°. Should the water in the refilling tank drop down to approximately 200° or thereabout, the refilling water can be brought back up to a temperature of 210° or higher by means of the reheating coil 50 located in the tank, as chamber 48$^b$.

If desired, water can be pumped from the wash-out water tank 40 into the locomotive boiler for the purpose of refilling the same by closing the valves 48$^a$ and 52$^g$, and the water from the tank 40 is now pumped through the pipes 52ª, 52ᶜ, 53, 48ᶜ and 49 and from thence through the flexible tube into the locomotive boiler.

A system of my improved construction is comparatively simple, is practically automatic in all of its operations, can be operated with great economy, utilizes practically all of the heat units contained in the water and steam blown off from the locomotive boiler to be cleaned and refilled, and the hot water and steam are delivered directly into tanks and there filtered and purified and are again forced into the locomotive boiler for washing out and refilling purposes.

It will be readily understood that minor changes in the size, form and arrangement of the various parts of my improved system can be readily made and substituted for those herein shown and described without departing from the spirit of my invention, the scope of which is set forth in the appended claims.

I claim:

1. In a locomotive boiler washing out and refilling system, the combination with a pair of tanks, one of which is adapted to contain water to be used in washing out the locomotive boiler and the other adapted to contain water to be used for refilling the locomotive boiler, means for separating the water from the steam blown out of the locomotive boiler and delivering said water to the wash out water tank means for condensing the steam after the water has been separated therefrom and immediately delivering all of said steam into the refilling water tank, means within each tank for effecting a precipitation of the sediment and slime contained in the water delivered thereinto, means in each tank for filtering the water after the steam has passed over the sediment precipitating means, and an automatically operating blow off means for effecting a discharge of the precipitated matter from each tank.

2. In a locomotive boiler washing out and refilling system, the combination with a tank adapted to contain washing out water, tubular means for conveying blown off water and steam from a locomotive boiler to said tank, means located in said tubular member for separating the water from the steam and delivering said water into the wash out water tank, means within said tank for precipitating the scale and sediment contained in the water delivered thereinto, and an automatically operating blow off means for effecting a discharge of the precipitated matter from said tank.

3. In a locomotive boiler washing out and refilling system, a tank adapted to contain washing out water, means for separating the water from the steam blown off from a locomotive boiler and delivering said water into the wash out water tank, means within said tank for precipitating the slime and sediment contained in the water delivered thereinto, an automatically operating blow off means for effecting a discharge of the precipitated matter from said tank, means for admitting comparatively cold water into said tank to temper the hot water delivered thereinto, which cold water passes through the precipitating means with the hot water and means controlled by the degree of heat of the water within said tank for controlling the inlet of comparatively cold water.

4. In a locomotive boiler washing-out and refilling system, a tank adapted to receive water to be used in washing out the locomotive boiler, which tank is provided with a precipitating compartment and a purified water compartment, means for delivering the hot water blown off from the locomotive boiler into the precipitating compartment, a series of baffle plates arranged in the upper portion of said precipitating compartment for effecting a precipitation of the slime and sediment contained in the water delivered into the precipitating compartment, and a means for filtering the water as it passes from the precipitating compartment into the purified water compartment.

5. In a locomotive boiler washing out and refilling system, a tank adapted to receive water to be used in washing out the locomotive boiler, which tank is provided with a precipitating compartment and a purified water compartment, means for delivering the hot water blown off from the locomotive boiler into the precipitating compartment, a series of baffle plates for effecting a precipitation of the slime and sediment contained in the water delivered into the precipitation chamber, a means for filtering the water as it passes from the precipitating compartment into the purified water compartment, and an automatically operating blow off means for discharging the slime and precipitated matter from the precipitating compartment.

6. In a locomotive boiler washing out and refilling system, a tank adapted to receive water to be used in washing out the locomotive boiler, which tank is provided with a precipitating compartment and a purified water compartment, means for delivering the hot water blown off from the locomotive boiler into the precipitating compartment, a series of baffle plates located in the upper portion of the precipitating compartment for effecting a precipitation of the slime and sediment contained in the water delivered into the precipitation chamber, a means for filtering the water as it passes from the precipitating compartment into the purified water compartment, means for delivering comparatively cold water into the precipitating compartment which cold water mixes with the warmer water and passes over the baffle plates whereby the sediment contained in said cold water is precipitated, and means controlled by the temperature of the water within said compartment and tank for controlling the inlet of comparatively cold water.

7. In a locomotive boiler washing out and refilling system, a tank adapted to receive water to be used in washing out the locomotive boiler, which tank is provided with a precipitating compartment and a purified water compartment, means for delivering the hot water blown off from the locomotive boiler into the precipitating compartment, a series of baffle plates over which the hot water passes for effecting a precipitation of the slime and sediment contained in the water delivered into the precipitation chamber, a means for filtering the water as it passes from the precipitating compartment into the purified water compartment, an automatically operating blow off means for discharging the slime and precipitated matter from the precipitating compartment, means for delivering comparatively cold water into the precipitating compartment which cold water mingles with the warmer water and passes over the baffle plates, thereby effecting a precipitation of the sediment contained in said cold water, and means controlled by the temperature of the water within said compartment and tank for controlling the inlet of comparatively cold water.

8. In a locomotive boiler washing out and refilling system, a tank having a precipitating compartment and purified water compartment, which tank is adapted to receive and hold the condensed steam blown off from a locomotive boiler, a series of baffle plates located within the upper portion of said precipitating compartment for effecting a precipitation of the scale and slime contained in the water of condensation delivered into the said precipitating compartment means for intermittently effecting a discharge of the precipitated matter from the precipitating compartment and means within the precipitating compartment for filtering all of the water condensed prior to its passage into the purified water compartment.

9. In a locomotive boiler washing out and refilling system, a tank having a precipitating compartment and purified water compartment, which tank is adapted to receive and hold the condensed steam blown off from a locomotive boiler, means within the precipitating compartment for effecting a precipitation of the scale and slime contained in the water of condensation delivered into the said precipitating compartment, means within the precipitating compartment for filtering all of the water of condensation prior to its passage into the purified water compartment, and an automatically operating blow off means for effecting a discharge of the scale and precipitated matter from the precipitating chamber.

10. In a locomotive boiler washing-out and refilling system, a pair of tanks adapted to contain water to be used for washing out and refilling a locomotive boiler, each of which tanks is provided with a precipitating compartment and a purified water compartment, a series of baffle plates located within each precipitating compartment for effecting a precipitation of the slime and sediment contained in the water delivered into said precipitating compartments, means for separating the water from the steam blown out of the locomotive boiler and delivering said water to the precipitating compartment of the washing-out water tank, means for filtering and purifying said water within said compartment, means for condensing the steam blown out of the locomotive boiler and delivering the same into the precipitating compartment of the refilling water tank, and means for filtering and purifying all of the water within the refilling water tank as said water passes from the precipitating compartment into the purified refilling water compartment.

11. In a locomotive boiler washing out and refilling system, a pair of tanks adapted to contain water to be used for washing out and refilling the locomotive boiler, each of which tanks is provided with a precipitating compartment and purified water compartment, means for separating the water from the steam blown out of the locomotive boiler and delivering said water to the precipitating compartment of the washing out water tank, a series of baffle plates located in the last mentioned precipitating compartment for effecting a precipitation of the slime and sediment contained in all the water delivered into said compartment, means for filtering said water within said compartment, means for condensing the steam blown out of the locomotive boiler and delivering the same into the precipitating compartment of the refilling water tank, a series of baffle plates within the last mentioned compartment for effecting a precipitation of the slime and sediment contained in all of the water delivered into said compartment, means for filtering the water of condensation as it passes through the precipitating compartment of the refilling water tank, and an automatically operating blow off means for discharging the slime and precipitated matter from the precipitating compartment of each tank.

12. In a locomotive boiler washing out and refilling system, the combination with a pair of tanks adapted to contain water to be used for washing out and refilling the locomotive boiler, each of which tanks is provided with a precipitating compartment and purified water compartment, means for separating the water from the steam blown out of the locomotive boiler and delivering said water to the precipitating compartment of the washing out water tank, means within the last mentioned compartment for effecting a precipitation of the slime and sediment contained in all the water delivered into said compartment, means for filtering said water within said compartment, means for condensing the steam blown out of the locomotive boiler and delivering the same into the precipitating compartment of the refilling water tank, means within the last mentioned compartment for effecting a precipitation of the slime and sediment contained in all the water of condensation delivered into said compartment, means for filtering the water of condensation as it passes through the precipitating compartment of the refilling water tank, an automatically operating blow off means for discharging the slime and precipitated matter from the precipitating compartment of both tanks, and means for delivering the purified washing out water and the purified refilling water into the locomotive boiler.

13. In a locomotive boiler washing out and refilling system, the combination with a pair of tanks adapted to contain water to be used for washing out and refilling the locomotive boiler, each of which tanks is provided with a precipitating compartment and purified water compartment, means for separating the water from the steam blown out of the locomotive boiler and delivering said water to the precipitating compartment of the washing out water tank, means within said last mentioned compartment for effecting a precipitation of the slime and sediment contained in all the water delivered into said compartment, means for filtering said water within said compartment, means for condensing all of the steam after the blown out water has been separated therefrom and delivering the water of condensation into the precipitating compartment of the refilling water tank, means within said last mentioned compartment for effecting a precipitation of the slime and sediment contained in all of the water of condensation delivered into said compartment, means for filtering the water of condensation as it passes through the precipitating compartment of the refilling water tank, an automatically operating blow off means for discharging the slime and precipitated matter from the precipitating compartments of both tanks, means for delivering the purified washing out water and the purified refilling water into the locomotive boiler, and means for heating the water during its passage from the refilling tank to the locomotive boiler.

14. In a locomotive boiler washing out and refilling system, a pair of tanks adapted to receive the water and the water of condensation of the steam blown off from the locomotive boiler to be washed out and refilled, each of which tanks is provided with a precipitating compartment and a purified water compartment, means within each precipitating compartment for effecting a precipitation of the scale and sediment contained in the water delivered into said compartment, means within each precipitating compartment for filtering all of the water which passes from the precipitating compartment into the purified water compartment, and means for automatically discharging the precipitated matter from each precipitating compartment.

15. In a locomotive boiler washing out and refilling system, the combination with a tank adapted to contain water to be used in refilling a locomotive boiler, means for condensing all of the steam blown off from the locomotive boiler and delivering same into the tank, means for effecting a precipitation of the slime and sediment contained in all of the water of condensation delivered into said tank, means within said tank for filtering the water of condensation delivered thereinto, means for conveying the purified water from the tank into the locomotive boiler and means for heating said purified water during its passage from said tank to the locomotive boiler.

16. In a locomotive boiler washing out and refilling system, a pair of tanks, one of which is adapted to contain water to be used in washing out the locomotive boiler and the other adapted to contain water to be used for refilling the locomotive boiler, means for receiving all of the water and steam blown off from a locomotive boiler and separating the water from said steam and delivering said water into the wash out water tank to maintain the water therein at the proper temperature for washing out purposes, means for condensing all of the steam blown out of the locomotive boiler and delivering all of the water of condensation into the refilling water tank to maintain the water therein at the required temperature, means for conveying water from the refilling water tank to the locomotive, and means for delivering live steam into said refilling water-conveying means for the purpose of increasing the temperature thereof.

17. In a locomotive boiler washing out and refilling system, the combination with a pair of tanks, one of which is adapted to contain water to be used in washing out the locomotive boiler and the other adapted to contain water to be used for refilling the locomotive boiler, of means for receiving all of the water and steam blown off from a locomotive boiler and separating the water from said steam and delivering said water into the wash out water tank to maintain the water therein at the proper temperature for washing out purposes, means for condensing all of the steam after the water has been separated from said steam and delivering all of the water of condensation into the refilling water tank to maintain the water therein at the required temperature, means for conveying water from the refilling tank to the locomotive and means located in the refilling water-conveying means for reheating the refilling water as it is delivered from the refilling water tank into the locomotive boiler.

18. In a locomotive boiler washing out and refilling system, the combination with a pair of tanks, one of which is adapted to contain water to be used in washing out the locomotive boiler and the other adapted to contain water to be used for refilling the locomotive boiler, of means for separating the water from the discharge from the blown off locomotive boiler and delivering said water to the wash out water tank, means for condensing the blown off steam and delivering same to the refilling water tank, means external of the refilling water tank for raising the temperature of the refilling water as the same passes from the refilling water tank to the locomotive and means for chemically treating the water in both tanks to assist in the precipitation of the slime and sediment contained in said water.

19. In a locomotive boiler washing out and refilling system, the combination with a pair of tanks, one of which is adapted to contain water to be used in washing out the locomotive boiler and the other adapted to contain water to be used for refilling the locomotive boiler, of means for separating the water from the discharge from the blown off locomotive boiler and delivering said water to the wash out water tank, means for condensing the blown off steam after the blown off water has been separated therefrom and delivering all of the water of condensation to the refilling water tank, means external of the refilling water tank for raising the temperature of the refilling water as the same passes from the refilling water tank to the locomotive and means for condensing the steam from a stationary heating plant and delivering same into the refilling water tank.

20. In a locomotive boiler washing out and refilling system, the combination with a pair of tanks, one of which is adapted to contain water to be used in washing out the locomotive boiler and the other adapted to contain water to be used for refilling the locomotive boiler, of means for separating the water from the discharge from the blown off locomotive boiler and delivering said water to the wash out water tank, means for condensing all of the blown off steam after the blown off water has been separated therefrom and delivering all of the water of condensation to the refilling water tank, means external of the refilling water tank for raising the temperature of the refilling water as the same passes from the refilling water tank to the locomotive, means for condensing the steam from a stationary heating plant and delivering same into the refilling water tank, means for chemically treating the water in both tanks, and means for filtering and purifying the water while in said tanks.

21. In a locomotive boiler washing out and refilling system, a tank having a precipitating compartment and purified water compartment, which tank is adapted to receive the condensed steam blown off from a locomotive boiler, a series of superimposed baffle plates within the precipitating compartment for effecting a precipitation of the sediment and slime contained in the water of condensation delivered into the said precipitating compartment, and means for chemically treating the water of condensation delivered into the tank.

22. In a locomotive boiler washing-out and refilling system, a tank adapted to contain water to be used for refilling the locomotive boiler, means for separating and condensing all of the steam blown off from a locomotive boiler and delivering the same into the refilling tank, means for effecting a precipitation of the slime and sediment contained in the water of condensation and condensing water delivered into the refilling water tank, a pipe leading from the refilling tank for conveying the water therefrom to the locomotive boiler to be refilled, and means external of the refilling water tank for raising the temperature of the refilling water as it passes from said tank to the locomotive.

23. In a locomotive boiler washing out and refilling system, a pair of tanks, one of which is adapted to contain water to be used in washing out the locomotive boiler and the other adapted to contain water to be used for refilling the locomotive boiler, means for separating the water from the discharge blown off from the locomotive boiler and delivering said water to the wash out water tank, means for condensing the blown off steam and delivering same to the refilling water tank, and controlled by the temperature of the water within the refilling tank for admitting cold water into both tanks for tempering the water delivered thereinto, a series of baffle plates within each tank for effecting a precipitation of the slime and sediment contained in the blown off water, the water of condensation and the cold water delivered into said tanks and an automatically operating means on each tank for intermittently discharging the precipitated slime and sediment.

24. In a locomotive boiler washing out and refilling system, a tank adapted to contain water to be used for refilling the locomotive boiler, means for conveying steam blown out of the locomotive boiler to said tank, means for condensing said steam, an intercepting tank wherein the pressure of the steam is reduced prior to its delivery into the tank, means within the first mentioned tank for purifying the water of condensation delivered thereinto, and means leading from the first mentioned tank for conveying the water of condensation while in a heated condition to a locomotive boiler for the purpose of refilling the same.

25. In a locomotive boiler washing-out and refilling system, a pair of tanks, a pipe adapted to be connected to a locomotive boiler for receiving all of the water and steam blown off therefrom, means connected to said pipe for effecting an initial separation of the blown off water from the blown off steam, a pipe leading from the separating means to one of the tanks, an intercepting tank located in said pipe for reducing the pressure of the steam as it is delivered into said tank, means within the last mentioned tank for effecting a precipitation of all of the slime and sediment contained in the water delivered thereinto, a pipe leading from said tank for conveying the water therefrom to a locomotive boiler to be used for washing out said boiler, a pipe leading from the initial separating means to the other tank, a jet condenser located in the last mentioned pipe, an intercepting tank located in said pipe behind the jet condenser for reducing the pressure of any steam which may leave the jet condenser, means within the last mentioned tank for effecting a precipitation of the slime and sediment contained in the water of condensation delivered into said tank and means leading from the last mentioned tank for conveying the water of condensation to a locomotive boiler for the purpose of refilling the same.

26. In a locomotive boiler washing out and refilling system, a pair of tanks, one of which is adapted to contain water to be used in washing out the locomotive boiler and the other adapted to contain water to be used in refilling the locomotive boiler, means for receiving all of the water and steam blown off from a locomotive boiler and separating the water from the steam and delivering said water into the wash-out water tank, means for condensing all of the steam blown out of the locomotive boiler and delivering all of the water of condensation into the refilling tank, means for conveying water from the wash-out water tank to the locomotive boiler, means for conveying water from the refilling water tank to the locomotive boiler, and means for increasing the temperature of the refilling water as it passes from the refilling water tank to the locomotive boiler.

27. In a locomotive boiler washing out and refilling system, a pair of tanks one of which is adapted to contain water to be used in washing the locomotive boiler and the other adapted to contain water to be used in refilling the locomotive boiler, means for receiving all of the water and steam blown off from a locomotive boiler and separating the water from the steam and delivering said water into the washing out water tank which means includes an intercepting tank for reducing the pressure of the steam, means for condensing all of the steam blown out of the locomotive boiler and delivering all of the water of condensation into the refilling tank, which means includes an intercepting tank for reducing the pressure of the steam, means for conveying water from the washing out water tank to the locomotive boiler, means for conveying water from the refilling water tank to the locomotive boiler, and means for increasing the temperature of the refilling water as it passes to the locomotive boiler.

In testimony whereof I hereunto affix my signature in the presence of two witnesses, this 1st day of November, 1911.

AUGUSTAS T. VICK.

Witnesses:
M. P. SMITH,
LILY ROST.

Copies of this patent may be obtained for five cents each, by addressing the "Commissioner of Patents, Washington, D. C."